US009591565B2

United States Patent
Park (10) Patent No.: US 9,591,565 B2
(45) Date of Patent: Mar. 7, 2017

(54) METHOD, SYSTEM AND APPARATUS FOR PROVIDING COEXISTENCE BETWEEN LOW POWER STATIONS AND NON-LOW POWER STATIONS

(71) Applicant: Intel Corporation, Santa Clara, CA (US)

(72) Inventor: Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 31 days.

(21) Appl. No.: 14/279,820

(22) Filed: May 16, 2014

(65) Prior Publication Data
US 2015/0334650 A1    Nov. 19, 2015

(51) Int. Cl.
G08C 17/00  (2006.01)
H04W 52/02  (2009.01)
H04W 84/12  (2009.01)

(52) U.S. Cl.
CPC ....... *H04W 52/0209* (2013.01); *H04W 84/12* (2013.01)

(58) Field of Classification Search
CPC . H04W 52/0209; H04W 84/12; H04W 52/00; H04W 52/02; H04W 52/0203; H04W 52/0206; H04W 52/0225; H04W 52/0229
See application file for complete search history.

(56) References Cited

U.S. PATENT DOCUMENTS

| 8,175,109 B2* | 5/2012 | Nogueira-Nine . H04W 52/0219 370/447 |
| 8,553,576 B2 | 10/2013 | Park et al. |
| 2005/0059347 A1* | 3/2005 | Haartsen ............... H04W 16/14 455/41.2 |
| 2010/0314452 A1* | 12/2010 | Yeo ....................... G06K 7/0008 235/492 |
| 2011/0103280 A1* | 5/2011 | Liu .................... H04W 52/0229 370/311 |
| 2011/0243267 A1* | 10/2011 | Won ........................ H04L 12/12 375/268 |

(Continued)

*Primary Examiner* — Kevin Mew
(74) *Attorney, Agent, or Firm* — Shichrur & Co.

(57) ABSTRACT

Examples are disclosed for techniques for allowing a wireless device to wake up a low power device while remaining compatible with other devices and wireless protocols. A first station determines that a low power device needs to wake up all or a portion of its circuitry in order to send and/or receive data from the first station. The first station sends a legacy preamble according to a standard wireless communication method such as according to IEEE 802.11 or Bluetooth addressed to the low power device. Legacy stations will recognize that a device is accessing the medium and will abstain from transmitting data during the transaction(s) between the first station and the low power device. The first station then sends a wake up payload according to a low power wireless communication method such as ASK or FSK to the low power device. The low power device recognizes the wake up payload and wakes up its main radio such as an IEEE 802.11 or Bluetooth radio. The first station sends and/or receives data to/from the low power device according to the standard wireless communication method. If there is no more data to send or receive, low power device powers down at least its main radio.

23 Claims, 4 Drawing Sheets

(56) References Cited

U.S. PATENT DOCUMENTS

| | | | |
|---|---|---|---|
| 2011/0255454 A1* | 10/2011 | Hauser | H04W 88/04 370/311 |
| 2012/0147800 A1 | 6/2012 | Park et al. | |
| 2012/0171954 A1* | 7/2012 | Rudland | H04W 52/0225 455/41.1 |
| 2012/0250596 A1 | 10/2012 | Park et al. | |
| 2013/0083722 A1* | 4/2013 | Bhargava | H04W 72/085 370/315 |
| 2013/0252657 A1* | 9/2013 | Kafle | H04W 52/367 455/522 |
| 2014/0050133 A1* | 2/2014 | Jafarian | H04W 74/085 370/311 |
| 2014/0086124 A1* | 3/2014 | Knowles | H04W 52/0229 370/311 |
| 2014/0098724 A1 | 4/2014 | Park et al. | |
| 2014/0105186 A1 | 4/2014 | Park et al. | |
| 2014/0112224 A1* | 4/2014 | Jafarian | H04W 52/0209 370/311 |
| 2014/0112229 A1* | 4/2014 | Merlin | H04W 52/0209 370/311 |
| 2014/0112246 A1 | 4/2014 | Park et al. | |
| 2014/0153507 A1* | 6/2014 | Yang | H04L 27/2602 370/329 |
| 2014/0185501 A1* | 7/2014 | Park | H04W 52/0238 370/311 |
| 2014/0185502 A1 | 7/2014 | Kenney et al. | |
| 2014/0211678 A1* | 7/2014 | Jafarian | H04W 52/0225 370/311 |
| 2014/0269462 A1* | 9/2014 | Jia | H04W 52/0229 370/311 |
| 2014/0269994 A1* | 9/2014 | HomChaudhuri | H04W 52/0209 375/316 |
| 2014/0302849 A1* | 10/2014 | Palin | H04W 8/005 455/436 |
| 2015/0139051 A1* | 5/2015 | Gonia | H04W 52/0209 370/311 |

* cited by examiner

METHOD, SYSTEM AND APPARATUS FOR PROVIDING COEXISTENCE BETWEEN LOW POWER STATIONS AND NON-LOW POWER STATIONS

TECHNICAL FIELD

The present disclosure relates generally to the field of wireless communications technologies. More particularly, the present disclosure relates to techniques for allowing a wireless device to wake up a low power device while remaining compatible with standard wireless communications technologies and other devices on a network.

BACKGROUND

Small low power computing devices such as wearable devices and sensors are constrained by their battery capacity. These low power devices need to support standard wireless communications technologies such as Wi-Fi or Bluetooth (BT) to connect to other computing devices (for example, a smartphone or other such device) and exchange data. Such support is problematic because standard wireless communications technologies consume significant power. It is critical to minimize energy consumption of the communications block of low power devices.

One strategy to minimize energy consumption may be to power off the communications block of a low power device as often as possible while maintaining data transmission and reception without increasing latency significantly. The low power device might power on the communications block only when there is data to receive and/or transmit, by waking up just before data reception/transmission, receiving and/or transmitting data, and powering off for the rest of the time.

However, this strategy introduces new problems, such as when and how to wake up the device when there is data to be received or transmitted. Further, such a solution to these new problems may cause issues with legacy devices, that is, those devices which were not designed for a network with low power devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", and the like, indicate that the embodiment(s) of the invention so described may include particular features, structures, or characteristics, but not every embodiment necessarily includes the particular features, structures, or characteristics. Further, some embodiments may have some, all, or none of the features described for other embodiments.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on one or more computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Conversion from one form of code to another does not need to take place in real time, or by the processor that executes the code. Such a computer-readable medium may include any tangible non-transitory medium for storing information in a form readable by one or more computers, such as but not limited to read only memory (ROM); random access memory (RAM); magnetic disk storage media; optical storage media; a flash memory, and the like.

The term "wireless" may be used to describe circuits, devices, systems, methods, techniques, communications channels, etc., that communicate data by using modulated electromagnetic radiation through a non-solid medium. The term "wireless device", as used herein, includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and/or the data that has been received. The processor(s) may also process other data which is neither transmitted nor received.

As used within this document, the term "mobile device" is intended to cover those devices whose wireless communications may be partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such wireless communications, but movement is not required. The term "station" (STA), as used herein, may include any logical entity that is a singly addressable instance of a medium access control (MAC) and a physical layer (PHY) interface to a wireless medium (WM).

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with standard wireless communications technologies such as devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; IEEE802.11 task group ac (TGac) ("*IEEE802.11-09/0308r12—TGac Channel Model Addendum Document*"); IEEE 802.11 task group ad (TGad) (*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*, 28 Dec. 2012)) and/or future versions and/or derivatives thereof, existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, existing WirelessHD™ specifications, and/or future versions and/or derivatives thereof, existing and/or Wireless Fidelity (WiFi) Alliance (WFA) Peer-to-Peer (P2P) specifications (*WiFi P2P technical specification, version* 1.3, 2012), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

Some embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Figure 1:
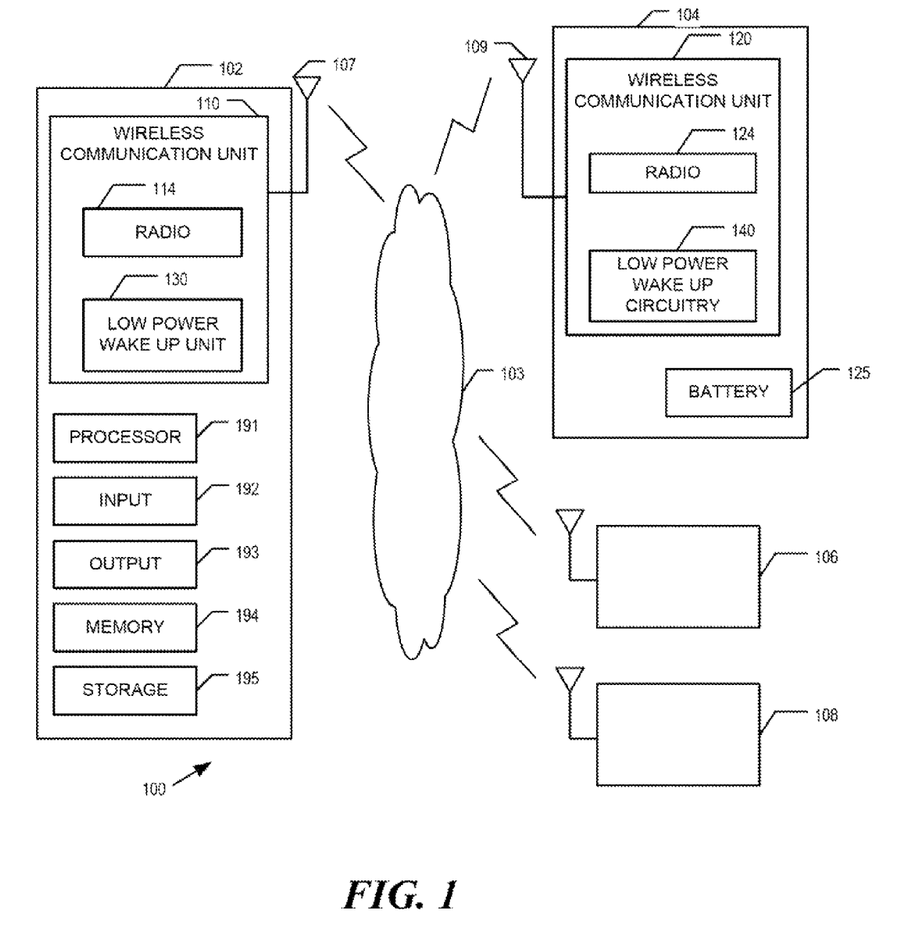
FIG. 1 illustrates an example schematic block diagram of a system in accordance with some embodiments.

FIG. 1 illustrates a schematic block diagram of a system 100 in accordance with some embodiments. In some embodiments system 100 may include a wireless communication network including one or more wireless communication devices, e.g., wireless communication devices 102, 104, 106 and/or 108, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some embodiments, wireless communication devices 102, 104, 106, and/or 108 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a smart phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

One or more of wireless communications devices 102, 104, 106, and/or 108 may be a low power device such as a sensor or a wearable device. Such low power device may or may not include a battery. Some low power devices may harvest power from RF communications.

In some embodiments, wireless communication devices 102, 104, 106 and/or 108 may include wireless communication units, to perform wireless communication between wireless communication devices 102, 104, 106, and/or 108 and/or with one or more other wireless communication devices. For example, device 102 may include a wireless communication unit 110 and device 104 may include a wireless communication unit 120, e.g., as described below.

Wireless communication devices 102, 104, 106, and/or 108 may also include, for example, one or more of a processor 191, an input unit 192, an output unit 193, a memory unit 194, and a storage unit 195. Wireless communication devices 102, 104, 106 and/or 108 may optionally include other suitable hardware components and/or software components. In some embodiments, some or all of the components of one or more of wireless communication devices 102, 104, 106 and/or 108 may be enclosed in a common housing or packaging, and may be interconnected or operably associated using one or more wired or wireless links. In other embodiments, components of one or more of wireless communication devices 102, 104, 106 and/or 108 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102, 104, 106 and/or 108 and/or of one or more suitable applications.

Input unit 192 includes, for example, a keyboard, a keypad, a mouse, a touch-screen, a touch-pad, a track-ball, a stylus, a microphone or, other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102, 104, 106 and/or 108.

In some embodiments, wireless medium 103 may include, for example, a Radio Frequency (RF) channel, a WiFi channel, a Bluetooth channel, a cellular channel, a Global Navigation Satellite System (GNSS) Channel, a Near Field Communication (NFC) channel, a Hybrid Digital Radio (HDR) channel, a Frequency Modulation (FM) channel, and the like.

In some embodiments, wireless communication units 110 and 120 may include, or may be associated with, one or more antennas 107 and 109, respectively. Antennas 107 and 109 may include any type of antennas suitable for transmitting and/or receiving wireless communication signals, blocks, frames, transmission streams, packets, messages and/or data. For example, antennas 107 and 109 may include any suitable configuration, structure and/or arrangement of one or more antenna elements, components, units, assemblies and/or arrays. Antennas 107 and 109 may include, for example, antennas suitable for directional communication. For example, antennas 107 and 109 may include a phased array antenna, a single element antenna, a set of switched beam antennas, and/or the like. In some embodiments, antennas 107 and 109 may implement transmit and receive functionalities using separate transmit and receive antenna elements. In some embodiments, antennas 107 and 109 may implement transmit and receive functionalities using common and/or integrated transmit/receive elements.

In some embodiments, wireless communication units 110 and/or 120 include, for example, one or more radios 114 and/or 124, respectively, for example, including one or more wireless transmitters, receivers and/or transceivers able to send and/or receive wireless communication signals, RF signals, frames, blocks, transmission streams, packets, messages, data items, and/or data. For example, wireless communication units 110 and/or 120 may include or may be implemented as part of a wireless Network Interface Card (NIC), and the like.

In some embodiments, wireless communication devices 102, 104, 106, and/or 108 may form a wireless local area network (WLAN).

One or more of wireless communications devices 102, 104, 106, and/or 108 may be a low power device such as a sensor or a wearable device. For example, wireless communication device 104 may be a low power device with a battery 125 as its power source. To reduce power consumption and preserve the life of battery 125, wireless communication device 104 may power down much of its circuitry and only wake up when it needs to send or receive data. Wireless communication unit 110 of wireless communication device 102 may include a low power wake up unit 130 that may send a wake up communication to low power wireless communications device 104 when there is data to send and/or receive. Wireless communications device 104 may include low power wake up circuitry 140 that may wake up powered down circuitry such as main radio 124 upon receipt of a wake up communication when there is data to receive and/or transmit. The wake up communication indicates wireless communications device 104 should wake up in order to send or receive data. Wireless communication device 104 may again power down some or all of its circuitry to reduce power consumption and preserve the life of battery 125 after all data has been received or transmitted.

Figure 2:
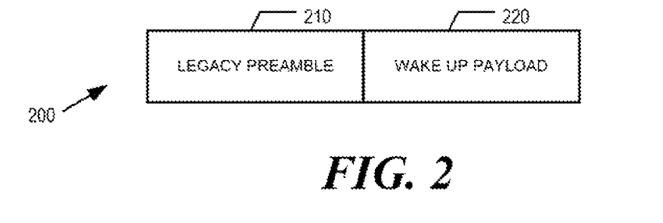
FIG. 2 illustrates an example low power wake up packet format in accordance with some embodiments.

FIG. 2 illustrates an example low power wake up packet format 200 in accordance with some embodiments. As shown in FIG. 2, the wake up packet 200 has at least two parts: first, a legacy preamble 210 that can be decoded by the legacy STAs and is communicated according to a standard wireless communications protocol and frequency, such as according to IEEE 802.11 or Bluetooth standards; and second, a wake up payload 220 that is communicated according to a different, low power signal waveform to transmit the wake up communication to a sleeping device. Wake up payload 220 may be transmitted according to any simple, low power communication method such as amplitude shift keying (ASK) or frequency shift keying (FSK). ASK is a form of amplitude modulation that represents digital data as variations in the amplitude of a carrier wave. FSK is a frequency modulation scheme in which digital information is transmitted through discrete frequency changes of a carrier wave. Such low power communication methods are simple to implement and low in power consumption. Research indicates that power consumption of such low power wake up radios may be less than 100 microwatts. Standard wireless communication protocols such as Wi-Fi or Bluetooth cannot be demodulated with such low power consumption.

According to some embodiments, legacy preamble 210 is received by devices on the network that have not powered down their communications block. A sleeping device will not receive legacy preamble 210. The devices that do receive legacy preamble 210 will recognize that a device is accessing the medium and will refrain from accessing the wireless medium until packet 200 and/or its related transactions are complete. Such completion time may be a standard set time or may be provided within legacy preamble 210.

According to some embodiments, wake up payload 220 may include a wake up identification sequence and an address identifying the device to be woken up. Wake up payload 220 may also include additional information such as the amount of data to be received or sent, scheduling information, and other various details about the data transmission.

According to some embodiments, wake up payload 220 is received by low power wake up circuitry on the sleeping device. Wake up payload 220 instructs the wake up of the device's communication circuitry. Other devices will ignore wake up payload 220 because the low power wake up packet was not addressed to them or because they may not receive wake up payload 220 since it is transmitted according to a different communications method than legacy preamble 210. Wake up payload 220 may include time information that can be used for scheduling purposes. For example, wake up payload 220 may indicate a future time at which the sleeping device should wake up to receive and/or send a data packet. Such scheduling times may include time for other frames to back off.

In some embodiments, wake up packet 200 is transmitted according to at least two different wireless protocols and frequencies so that the low power device can coexist with a legacy device that may not be configured to operate on a network with low power devices. By sending a packet with a legacy header, the possibility of collisions is reduced because the legacy preamble reserves the wireless medium and thereby prohibits legacy devices from accessing the wireless medium during the reserved time.

Figure 3:
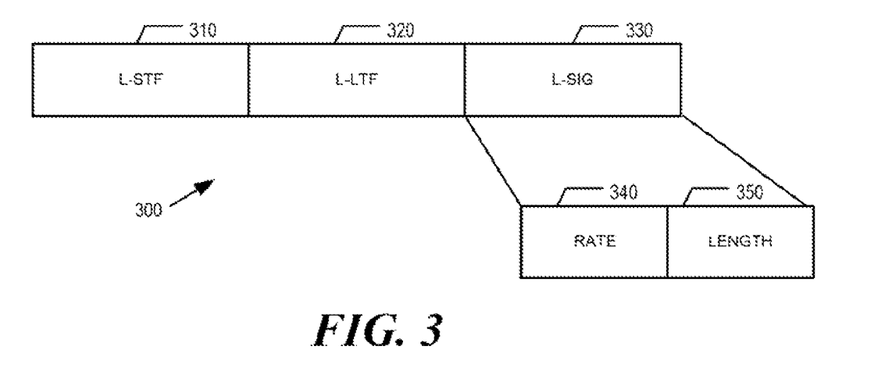
FIG. 3 illustrates an example legacy preamble packet format according to IEEE 802.11 protocol in accordance with some embodiments.

FIG. 3 illustrates an example legacy preamble packet format 300 according to IEEE 802.11 protocol in accordance with some embodiments. The legacy preamble 300 may include Legacy (or Non-High-Throughput) Short Training Field (L-STF) 310, Legacy Long Training Field (L-LTF) 320, and Legacy Signal Field (L-SIG) 330 as shown in FIG. 3. The RATE field 340 and the LENGTH field 350 in the L-SIG 330 field can be used to indicate to legacy devices, such as wireless communication device 106 or 108, the length of the wake up packet and related transactions, so that the legacy devices do not interfere with the wake up packet by attempting to send data and creating collisions with the wake up packet and data being received and/or transmitted.

Figure 4:
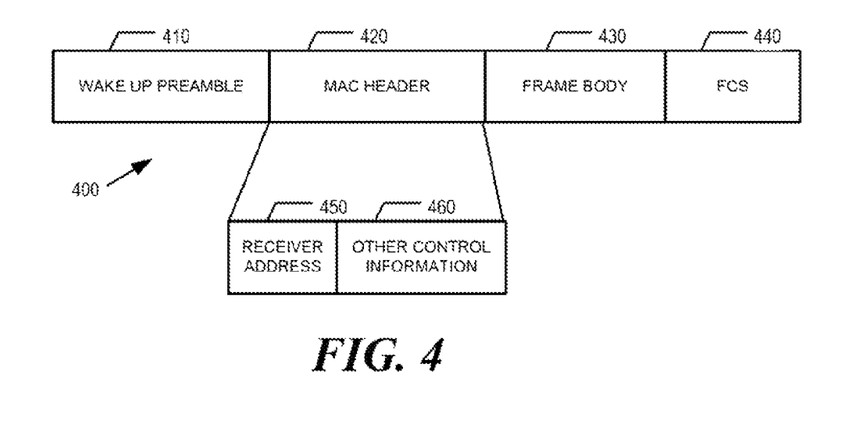
FIG. 4 illustrates an example wake up payload packet format in accordance with some embodiments.

FIG. 4 illustrates an example wake up payload packet format 400 in accordance with some embodiments. Wake up payload packet format 400 may include a Wake Up Preamble field 410, a MAC Header field 420, a Frame Body field 430, and a frame check sequence (FCS) field 440. Wake Up Preamble field 410 identifies the beginning of the wake up communication for the low power wake up circuitry. MAC Header field 420 may include a receiver address (RA) field 450 and other control information fields 460 which may include frame control, duration, sequence control information and the like. Frame Body field 430 may include information specific to the frame type and subtype. FCS field 440 may be any frame check sequence, for example, a 32-bit cyclic redundancy code (CRC).

Figure 5:
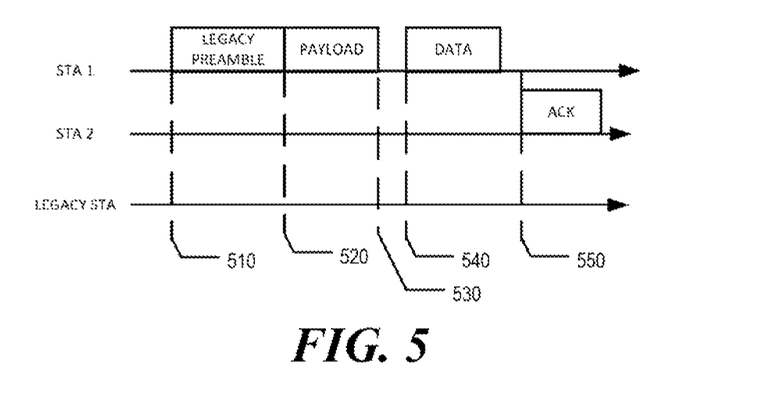
FIG. 5 illustrates an example IEEE 802.11 network exchange in accordance with some embodiments.

FIG. 5 illustrates an example IEEE 802.11 network exchange in accordance with some embodiments. When station 1 (STA1) has data to transmit to a sleeping device STA2, STA1 transmits a wake up packet at 510, beginning with the Legacy Preamble. The Legacy STA detects the legacy preamble of the wake up packet at 520 and will recognize that a device is accessing the medium. The Legacy STA does not recognize the wake up payload since the wake up payload is transmitted according to a different communications method, such as ASK or FSK The Legacy STA defers its channel access until the end of the wake up packet and/or its related transactions based on the information in the L-SIG field of the legacy preamble. STA2's main radio (for example, its IEEE 802.11 radio) is powered off and only the low power wake up circuitry is active to receive a wake up payload. STA1 begins transmitting the payload using a low power communication method at 520. The low power wake up circuitry of STA2 detects the Wake up Preamble field and recognizes the start of the wake up payload. If the receiver address field of the MAC Header field matches the address of STA2, the wake up circuitry wakes up the main radio at 530 or at some later time designated by the information in the payload. STA1 transmits a data packet after an inter-frame space (IFS) time such as short inter-frame space (SIFS) or point (coordination function) inter-frame space (PIFS) at 540. Upon receiving the data packet from STA1, STA2 responds with an acknowledgement (ACK) frame at 550. If there are no more pending transmissions or receptions of packets, STA2 may turn off the main radio and wait for another wake up packet. The legacy preamble, data, and ACK may be transmitted in accordance with IEEE 802.11 technologies. The wake up payload may be transmitted in accordance with a low power communication method such as ASK or FSK.

Figure 6:
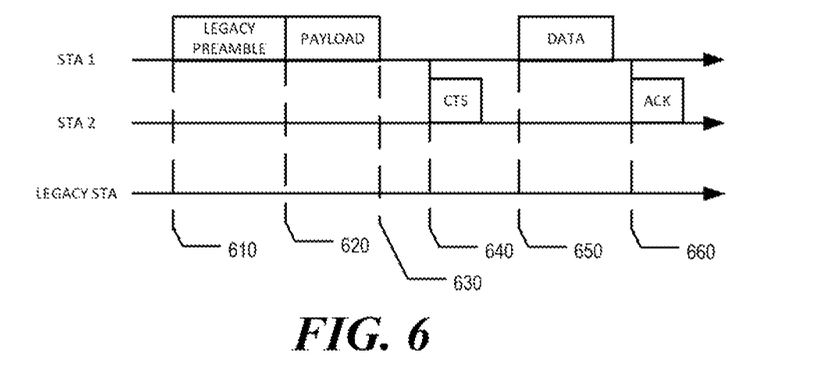
FIG. 6 illustrates another example IEEE 802.11 network exchange in accordance with some embodiments.

FIG. 6 illustrates another example IEEE 802.11 network exchange in accordance with some embodiments. When station 1 (STA1) has data to transmit to a sleeping device STA2, STA1 transmits a wake up packet at 610, beginning with the Legacy Preamble. The Legacy STA detects the legacy preamble of the wake up packet at 620 and will recognize that a device is accessing the medium. The Legacy STA does not recognize the wake up payload since the wake up payload is transmitted according to a different communications method, such as ASK or FSK. The Legacy STA defers its channel access until the end of the wake up packet and/or its related transactions based on the information in the L-SIG field of the legacy preamble. STA2's main radio (for example, its 802.11 radio) is powered off and only the low power wake up circuitry is active to receive a wake up payload. STA1 begins transmitting the payload using a low power communication method at 620. The low power wake up circuitry of STA2 detects the Wake up Preamble field and recognizes the start of the wake up payload. If the receiver address field of the MAC Header field matches the address of STA2, the wake up circuitry wakes up the main radio at 630 or at some later time designated by the information in the payload. Instead of transmitting a data packet following the wake up packet, upon reception of the wake up packet STA2 responds with a clear to send (CTS) frame at 640 to indicate that the wake up payload was received correctly and STA2's main radio is ready to receive a data packet. The CTS frame sets a network allocation vector (NAV) for other STAs indicating that the STAs should not transmit during this time frame. STA1 transmits a data packet a SIFS time after the CTS frame at 650. STA2 responds with an ACK frame upon receiving the data packet correctly at 660. If the CTS frame is not received after transmission of the wake up packet until a time out timer expires, STA1 may retransmit a wake up packet assuming that the wake up packet was not received correctly at STA2. The legacy preamble, data, CTS, and ACK are transmitted in accordance with IEEE 802.11 technologies. The wake up payload is transmitted in accordance with a low power communication method such as ASK or FSK.

Figure 7:
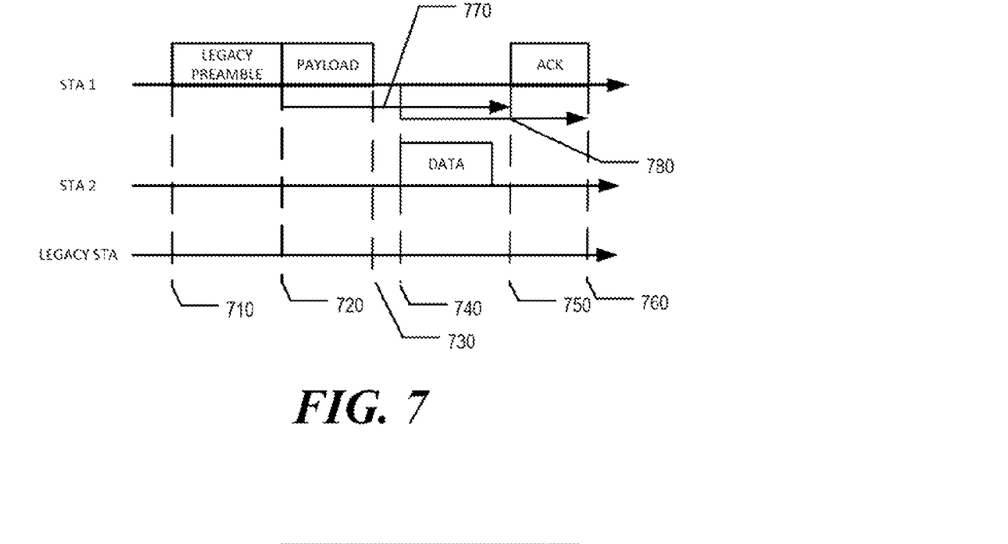
FIG. 7 illustrates another example IEEE 802.11 network exchange in accordance with some embodiments.

FIG. 7 illustrates another example 802.11 network exchange in accordance with some embodiments. STA1 may be a device such as an access point (AP) or a smart phone contending for channel access on behalf of low power STA2 such as a wearable device. This reduces the energy consumption due STA1 contending for channel access for STA2 as shown in FIG. 7. Instead of STA2 sensing, synchronizing, and contending for the wireless medium, STA1 can contend for the wireless medium for STA2. When STA1 obtains the wireless medium, STA1 can transmit at 710 a wake up packet that contains the address of STA2. The RATE field and the Length field of the L-SIG field of the Legacy Preamble can be used to protect the following data packet received from STA2. STA1 begins transmitting the wake up payload using a low power communication method at 720. The low power wake up circuitry of STA2 detects the Wake up Preamble field and recognizes the start of the wake up payload. If the receiver address field of the MAC Header field matches the address of STA2, the wake up circuitry wakes up the main radio at 730 or at some later time designated by the information in the payload. If there is data to transmit, STA2 transmits a data packet SIFS time after the reception of the wake up payload at 740. Upon receiving the data packet from STA2, STA1 responds with an ACK frame at 750. This exchange eliminates the power consumption due to the channel access delay for STA2, for example, a wearable device having limited power resources. As illustrated, time frame 770 represents L-SIG duration and time frame 780 represents MAC duration. The legacy preamble, data, and ACK are transmitted in accordance with IEEE 802.11 technologies. The wake up payload is transmitted in accordance with a low power communication method such as ASK or FSK.

Figure 8:
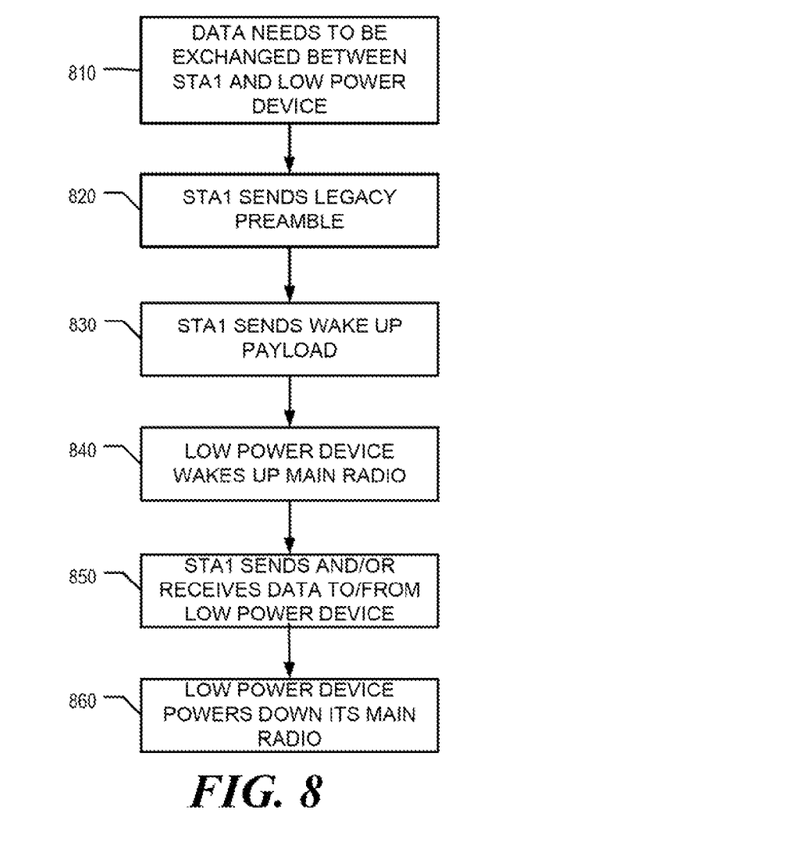
FIG. 8 illustrates an example flow diagram in accordance with some embodiments.

FIG. 8 illustrates an example flow diagram in accordance with some embodiments. The flow begins when data needs to be exchanged between a station (STA1) and a low power device, block 810. STA1 sends a legacy preamble according to a standard wireless communication method such as according to IEEE 802.11 or Bluetooth, block 820. STA1 then sends a wake up payload according to a low power wireless communication method such as ASK or FSK, block 830. The low power device wakes up its main radio such as an IEEE 802.11 or Bluetooth radio, block 840. STA1 sends and/or receives data according to the standard wireless communication method to/from the low power device, block 850. If there is no more data to send or receive, low power device powers down at least its main radio, block 860.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

EXAMPLES

The following examples pertain to further embodiments.

Example 1 includes a method of wireless communication, the method comprising transmitting, according to a standard wireless communications technology, a first part of a wake up packet including a legacy header; transmitting, according to a low power wireless communications method, a second part of a wake up packet including a wake up payload addressed to a low power device; and exchanging, according to the standard wireless communications technology, data with the low power device.

Example 2 includes the subject matter of Example 1, wherein the legacy header reserves a wireless medium preventing other devices from transmitting for a period of time.

Example 3 includes the subject matter of any one of Examples 1-2, wherein the wake up payload indicates that the low power device should wake up its radio that is capable of communicating according to the standard wireless communications technology.

Example 4 includes the subject matter of any one of Examples 1-3, the exchanging data further comprising transmitting data to the low power device according to the standard wireless communications technology.

Example 5 includes the subject matter of Example 4, the exchanging data further comprising receiving an acknowledge message from the lower power device, the acknowledge message received according to the standard wireless communications technology.

Example 6 includes the subject matter of Example 4, further comprising receiving a clear to send message from the low power device prior to the transmitting the data, the clear to send message received according to the standard wireless communications technology.

Example 7 includes the subject matter of any one of Examples 1-3, wherein the exchanging data comprises receiving data from the low power device according to the standard wireless communications technology.

Example 8 includes the subject matter of Example 7, the exchanging data further comprising transmitting an acknowledge message to the low power device according to the standard wireless communications technology.

Example 9 includes the subject matter of any one of Examples 1-8, wherein the low power wireless communications method is one of amplitude shift keying (ASK) and frequency shift keying (FSK).

Example 10 includes the subject matter of any one of Examples 1-9, wherein the standard wireless communications technology is IEEE 802.11.

Example 11 includes the subject matter of any one of Examples 1-9, wherein the standard wireless communications technology is Bluetooth.

Example 12 includes the subject matter of any one of Examples 1-11, wherein the low power device does not receive the legacy header because its radio capable of communicating according to the standard wireless communication technology is powered down.

Example 13 includes the subject matter of any one of Examples 1-12, wherein the legacy header comprises training fields and information identifying the length of the wake up packet.

Example 14 includes the subject matter of any one of Examples 1-13, wherein the wake up payload comprises a wake up identification sequence, an address identifying the low power device, and a frame check sequence.

Example 15 includes a computer-readable non-transitory storage medium that contains instructions, which when executed by one or more processors result in performing the operations of any one of Examples 1-14.

Example 16 includes a wireless communications device having a processor, a memory, and a radio, the device adapted to perform the any one of the operations of Examples 1-14.

Example 17 includes a wireless communications device having means for performing any one of the operations of Examples 1-14.

Example 18 includes a wireless communications device comprising a radio to transmit, according to a standard wireless communications technology, a first part of a wake up packet including a legacy header; a low power wake up unit to transmit, according to a low power wireless communications method, a second part of a wake up packet including a wake up payload addressed to a low power device; and the radio further to exchange data with the low power device according to the standard wireless communications technology.

Example 19 includes the subject matter of Example 18, wherein the legacy header contains information to reserve a wireless medium preventing other devices from transmitting for a period of time.

Example 20 includes the subject matter of any one of Examples 18-19, wherein the wake up payload indicates that the low power device should wake up its radio that is capable of communicating according to the standard wireless communications technology.

Example 21 includes the subject matter of any one of Examples 18-20, the radio to exchange the data comprises to transmit data to the low power device according to the standard wireless communications technology.

Example 22 includes the subject matter of Example 21, the radio to exchange the data further comprises to receive an acknowledge message from the lower power device, the acknowledge message received according to the standard wireless communications technology.

Example 23 includes the subject matter of Example 21, the radio further to receive a clear to send message from the low power device prior to the transmitting the data, the clear to send message received according to the standard wireless communications technology.

Example 24 includes the subject matter of any one of Examples 18-19, the radio to exchange the data further comprises to receive data from the low power device according to the standard wireless communications technology.

Example 25 includes the subject matter of Example 24, the radio to exchange the data further comprises to transmit an acknowledge message to the low power device according to the standard wireless communications technology.

Example 26 includes the subject matter of any one of Examples 18-25, wherein the low power wireless communications method is one of amplitude shift keying (ASK) and frequency shift keying (FSK).

Example 27 includes the subject matter of any one of Examples 18-26, wherein the standard wireless communications technology is IEEE 802.11.

Example 28 includes the subject matter of any one of Examples 18-26, wherein the standard wireless communications technology is Bluetooth.

Example 29 includes the subject matter of any one of Examples 18-28, wherein the low power device does not receive the legacy header because its radio capable of communicating according to the standard wireless communication technology is powered down.

Example 30 includes the subject matter of any one of Examples 18-29, wherein the legacy header comprises training fields and information identifying the length of the wake up packet.

Example 31 includes the subject matter of any one of Examples 18-30, wherein the wake up payload comprises a wake up identification sequence, an address identifying the low power device, and a frame check sequence.

Example 32 includes a method of wireless communication comprising powering down a radio capable of communicating according to a standard wireless communications technology when there is no data to exchange; receiving a wake up payload according to a low power wireless communications method; waking up the radio as instructed by the wake up payload; and exchanging data according to the standard wireless communications technology.

Example 33 includes the subject matter of Example 32, the exchanging data further comprising receiving data according to the standard wireless communications technology.

Example 34 includes the subject matter of any of Examples 32-33, the exchanging data further comprising transmitting an acknowledge message, the acknowledge message transmitted according to the standard wireless communications technology.

Example 35 includes the subject matter of Example 33, further comprising transmitting a clear to send message prior to the receiving the data, the clear to send message transmitted according to the standard wireless communications technology.

Example 36 includes the subject matter of Example 32, wherein the exchanging data comprises transmitting data according to the standard wireless communications technology.

Example 37 includes the subject matter of Example 36, the exchanging data further comprising receiving an acknowledge message according to the standard wireless communications technology.

Example 38 includes the subject matter of any of Examples 32-37, wherein the low power wireless communications method is one of amplitude shift keying (ASK) and frequency shift keying (FSK).

Example 39 includes the subject matter of any of Examples 32-38, wherein the standard wireless communications technology is IEEE 802.11.

Example 40 includes the subject matter of any of Examples 32-38, wherein the standard wireless communications technology is Bluetooth.

Example 41 includes the subject matter of any of Examples 32-40, wherein the wake up payload comprises a wake up identification sequence and a frame check sequence.

Example 42 includes a low power device comprising a low power wake up circuitry to receive, according to a low power wireless communications method, a part of a wake up packet including a wake up payload addressed to the low power device and wake up a radio as instructed by the wake up packet; and the radio to exchange data according to a standard wireless communications technology.

Example 43 includes the subject matter of Example 42, the radio to exchange the data comprises to receive data according to the standard wireless communications technology.

Example 44 includes the subject matter of Example 43, the radio to exchange the data further comprises to transmit an acknowledge message, the acknowledge message transmitted according to the standard wireless communications technology.

Example 45 includes the subject matter of any of Examples 42-44, the radio further to transmit a clear to send message prior to the receiving the data, the clear to send message transmitted according to the standard wireless communications technology.

Example 46 includes the subject matter of Example 42, the radio to exchange the data further comprises to transmit data to the standard wireless communications technology.

Example 47 includes the subject matter of Example 46, the radio to exchange the data further comprises to receive an acknowledge message according to the standard wireless communications technology.

Example 48 includes the subject matter of any of Examples 42-47, wherein the low power wireless communications method is one of amplitude shift keying (ASK) and frequency shift keying (FSK).

Example 49 includes the subject matter of any of Examples 42-48, wherein the standard wireless communications technology is IEEE 802.11.

Example 50 includes the subject matter of any of Examples 42-48, wherein the standard wireless communications technology is Bluetooth.

Example 51 includes the subject matter of any of Examples 42-50, wherein the wake up payload comprises a wake up identification sequence, an address identifying the low power device, and a frame check sequence.

The foregoing description is intended to be illustrative and not limiting. Variations will occur to those of skill in the art. Those variations are intended to be included in the various embodiments of the invention, which are limited only by the scope of the following claims.

What is claimed is:
1. A method of wireless communication, the method comprising:
  instructing a low power device to wake up at least a radio of the low power device, the instructing comprising:
    transmitting, according to a standard wireless communications technology, a first part of a wake up packet comprising a legacy header, the legacy header comprising a Legacy Short Training Field, followed by a Legacy Long Training Field, which is followed by a Legacy Signal field, the Legacy Signal field comprises a rate field and a length field; and
    transmitting, according to a low power wireless communications method, a second part of the wake up packet comprising a wake up payload addressed to the low power device, the wake up payload comprising a wakeup preamble to identify a beginning of a wakeup communication, the wakeup preamble followed by a Media Access Control (MAC) Header comprising a receiver address of the low power device, the MAC header followed by a frame body and a Frame Check Sequence, wherein the rate field and the length field indicate at least a duration of the wake up payload; and
  exchanging, according to the standard wireless communications technology, data with the low power device.

2. The method of claim 1, wherein the legacy header reserves a wireless medium preventing other devices from transmitting for a period of time.

3. The method of claim 1, wherein the wake up payload indicates that the low power device should wakeup its radio to communicate according to the standard wireless communications technology.

4. The method of claim 1, the exchanging data comprising transmitting data to the low power device according to the standard wireless communications technology.

5. The method of claim 4, the exchanging data comprising receiving an acknowledge message from the low power device according to the standard wireless communications technology.

6. The method of claim 4, further comprising receiving a clear to send message from the low power device prior to the transmitting the data, the clear to send message received according to the standard wireless communications technology.

7. The method of claim 1, wherein the exchanging data comprises receiving data from the low power device according to the standard wireless communications technology.

8. The method of claim 7, the exchanging data further comprising transmitting an acknowledge message to the low power device according to the standard wireless communications technology.

9. The method of claim 1, wherein the low power wireless communications method is one of amplitude shift keying (ASK) and frequency shift keying (FSK).

10. The method of claim 1, wherein the standard wireless communications technology is an IEEE 802.11 standard.

11. The method of claim 1, wherein the standard wireless communications technology is Bluetooth.

12. The method of claim 1, wherein the legacy header is not receivable by the low power device when a radio of the low power device capable of communicating according to the standard wireless communication technology is powered down.

13. A wireless communications device comprising:
a radio to transmit, according to a standard wireless communications technology, a first part of a wake up packet comprising a legacy header, the legacy header comprising a Legacy Short Training Field, followed by a Legacy Long Training Field, which is followed by a Legacy Signal field, the Legacy Signal field comprises a rate field and a length field; and
a low power wake up circuitry to instruct a low power device to wake up at least a radio of the low power device, the low power wake up circuitry to transmit, according to a low power wireless communications method, a second part of the wake up packet comprising a wake up payload addressed to the low power device, the wake up payload comprising a wakeup preamble to identify a beginning of a wakeup communication, the wakeup preamble followed by a Media Access Control (MAC) Header comprising a receiver address of the low power device, the MAC header followed by a frame body and a Frame Check Sequence, wherein the rate field and the length field indicate at least a duration of the wakeup payload,
the radio further to exchange data with the low power device according to the standard wireless communications technology.

14. The wireless communications device of claim 13, wherein the wake up payload indicates that the low power device should wakeup its radio to communicate according to the standard wireless communications technology.

15. The wireless communications device of claim 13, wherein the low power wireless communications method is one of amplitude shift keying (ASK) and frequency shift keying (FSK).

16. The wireless communications device of claim 13, wherein the standard wireless communications technology is an IEEE 802.11 standard.

17. The wireless communications device of claim 13, wherein the legacy header is not receivable by the low power device when a radio of the low power device capable of communicating according to the standard wireless communication technology is powered down.

18. A method of wireless communication to be performed at a low power device, the method comprising:
powering down a radio capable of communicating according to a standard wireless communications technology when there is no data to exchange;
receiving a wake up payload of a wake up packet according to a low power wireless communications method, the wake up payload comprising a wakeup preamble to identify a beginning of a wakeup communication, the wakeup preamble followed by a Media Access Control (MAC) Header comprising a receiver address of the low power device, the MAC header followed by a frame body and a Frame Check Sequence, wherein at least a duration of the wakeup payload is indicated by a rate field and a length field in a legacy header of the wake up packet;
waking up the radio as instructed by the wake up payload; and
exchanging data according to the standard wireless communications technology.

19. The method of claim 18, wherein the low power wireless communications method is one of amplitude shift keying (ASK) and frequency shift keying (FSK).

20. The method of claim 18, wherein the standard wireless communications technology is an IEEE 802.11 standard.

21. The method of claim 18, wherein the wake up payload comprises a wake up identification sequence and a frame check sequence.

22. A low power device comprising:
a radio; and
a low power wake up circuitry to receive, according to a low power wireless communications method, a part of a wake up packet including a wake up payload addressed to the low power device, and to wake up the radio as instructed by the wake up packet, the wake up payload comprising a wakeup preamble to identify a beginning of a wakeup communication, the wakeup preamble followed by a Media Access Control (MAC) Header comprising a receiver address of the low power device, the MAC header followed by a frame body and a Frame Check Sequence, wherein at least a duration of the wake up payload is indicated by a rate field and a length field in a legacy header of the wake up packet,
the radio to exchange data according to a standard wireless communications technology.

23. The low power device of claim 22, wherein the low power wireless communications method is one of amplitude shift keying (ASK) and frequency shift keying (FSK).

* * * * *

UNITED STATES PATENT AND TRADEMARK OFFICE
CERTIFICATE OF CORRECTION

| | |
|---|---|
| PATENT NO. | : 9,591,565 B2 |
| APPLICATION NO. | : 14/279820 |
| DATED | : March 7, 2017 |
| INVENTOR(S) | : Minyoung Park |

It is certified that error appears in the above-identified patent and that said Letters Patent is hereby corrected as shown below:

In the Claims

In Column 15, Line 37, in Claim 12, delete "communication" and insert -- communications --, therefor.

In Column 16, Line 13, in Claim 17, delete "communication" and insert -- communications --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*